FOLDABLE TRAILERIZED SHELL

Filed June 30, 1966 11 Sheets-Sheet 1

INVENTOR
JOHN CHRISTOPHER JAFFE

BY
Blum, Moscovitz, Friedman, Blum & Kaplan
ATTORNEYS

Dec. 24, 1968 J. C. JAFFE 3,417,518

FOLDABLE TRAILERIZED SHELL

Filed June 30, 1966 11 Sheets-Sheet 2

INVENTOR
JOHN CHRISTOPHER JAFFE

BY
Blum, Moscovitz, Friedman, Blum & Kaplan
ATTORNEYS

Dec. 24, 1968 J. C. JAFFE 3,417,518

FOLDABLE TRAILERIZED SHELL

Filed June 30, 1966 11 Sheets-Sheet 3

INVENTOR
JOHN CHRISTOPHER JAFFE
BY
Blum, Moscovitz, Friedman, Blum & Kaplan
ATTORNEYS

FOLDABLE TRAILERIZED SHELL

Filed June 30, 1966 11 Sheets-Sheet 4

INVENTOR
JOHN CHRISTOPHER JAFFE
BY
Blum, Moscovitz, Friedman, Blum & Kaplan
ATTORNEYS

FOLDABLE TRAILERIZED SHELL

Filed June 30, 1966 11 Sheets-Sheet 5

INVENTOR
JOHN CHRISTOPHER JAFFE
BY
Blum, Moscovitz, Friedman, Blum & Kaplan
ATTORNEYS FOLDABLE TRAILERIZED SHELL
Filed June 30, 1966 11 Sheets-Sheet 6
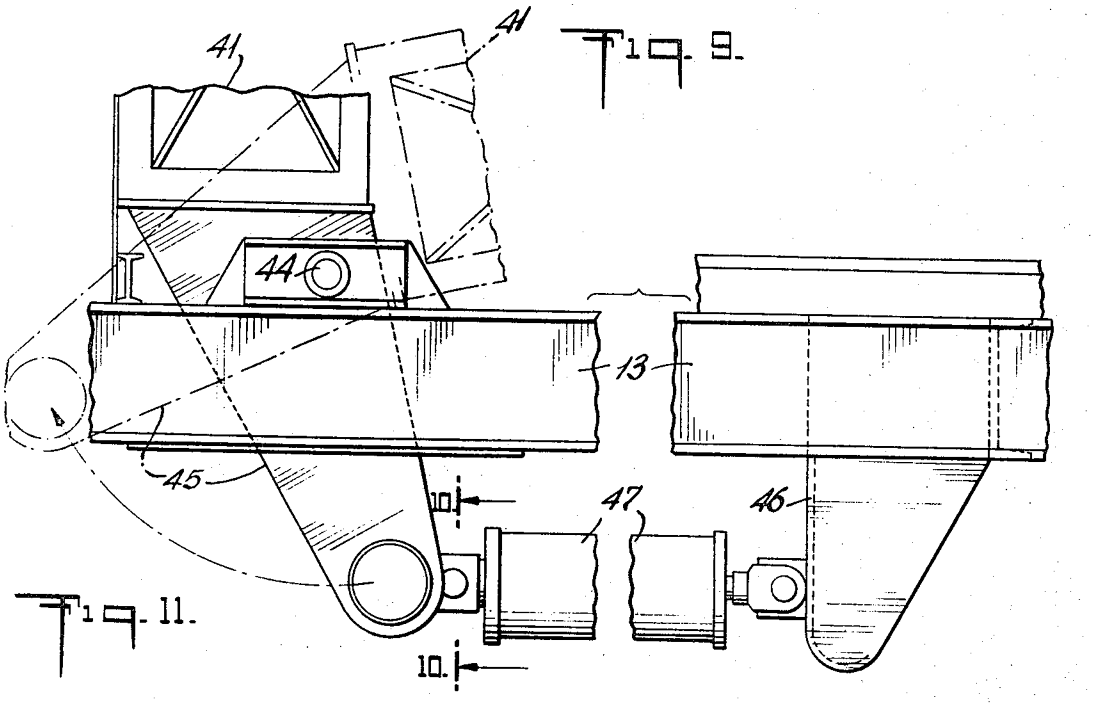
FIG. 9, FIG. 11
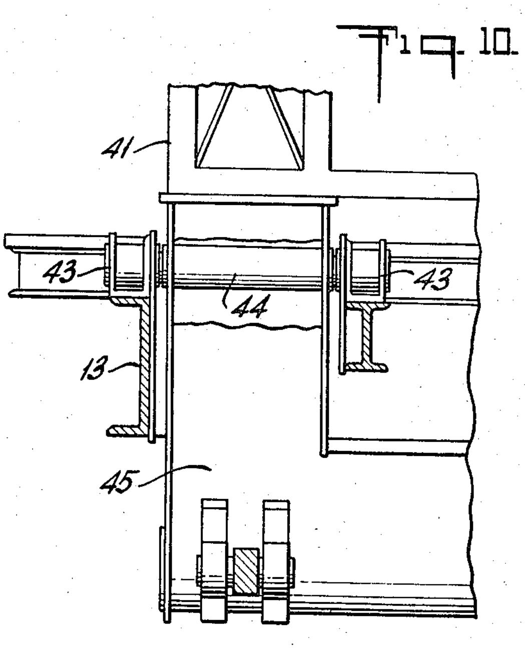
FIG. 10
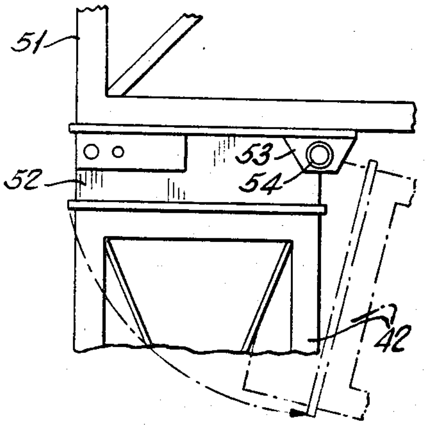
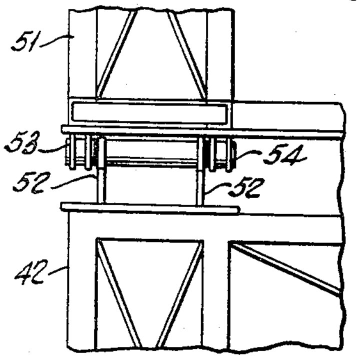
FIG. 12
INVENTOR
JOHN CHRISTOPHER JAFFE
BY
Blum, Moscovitz, Friedman, Blum & Kaplan
ATTORNEYS Dec. 24, 1968 J. C. JAFFE 3,417,518

FOLDABLE TRAILERIZED SHELL

Filed June 30, 1966 11 Sheets-Sheet 7

INVENTOR
JOHN CHRISTOPHER JAFFE
BY
Blum, Moscovitz, Friedman, Blum & Kaplan
ATTORNEYS INVENTOR
JOHN CHRISTOPHER JAFFE
BY
Blum, Moscovitz, Friedman, Blum & Kaplan
ATTORNEYS

FOLDABLE TRAILERIZED SHELL

Filed June 30, 1966 11 Sheets-Sheet 9

INVENTOR
JOHN CHRISTOPHER JAFFE
BY
Blum, Moscovitz, Friedman, Blum & Kaplan
ATTORNEYS Dec. 24, 1968 J. C. JAFFE 3,417,518

FOLDABLE TRAILERIZED SHELL

Filed June 30, 1966 11 Sheets-Sheet 10

INVENTOR
JOHN CHRISTOPHER JAFFE
BY
Blum, Moscovitz, Friedman, Blum & Kaplan
ATTORNEYS Dec. 24, 1968 J. C. JAFFE 3,417,518

FOLDABLE TRAILERIZED SHELL

Filed June 30, 1966 11 Sheets-Sheet 11

INVENTOR
JOHN CHRISTOPHER JAFFE

BY

Blum, Moscovitz, Friedman, Blum & Kaplan
ATTORNEYS

United States Patent Office 3,417,518

Patented Dec. 24, 1968

3,417,518

FOLDABLE TRAILERIZED SHELL

John Christopher Jaffe, Norwalk, Conn., assignor to Stagecraft Corporation, Norwalk, Conn., a corporation of New York Filed June 30, 1966, Ser. No. 562,957
12 Claims. (Cl. 52—7)

ABSTRACT OF THE DISCLOSURE

A trailerized shell for transport to a site in the form of multiple trailers and erection at the site to form a single large shell which can be used as a concert stage.

This invention relates generally to a trailerized shell and more particularly to an improved shell especially adapted for outdoor use for concerts and other performances. The trailerized shell of the instant invention is constructed for ready assembly and disassembly whereby it may be moved to various locations and quickly set up for a concert, for example.

While the construction of stages and platforms for assembly and disassembly has been known in the art, the instant invention is directed to a series of self-contained units which may be rapidly set up in cooperating relationship to provide a shell having characteristics akin to a permanent structure, especially with respect to acoustical properties thereof. In other words, the trailerized shell is adapted to provide a permanent structure which may be set in place or disassembled, transported and then set in place as distinct from a make shift structure. With the trailerized shell of the instant invention, a concert stage may be set up in a field to provide a stage and acoustical shell from which a high quality performance may emanate. After the performance, the structure may be readily placed in condition for transport to another site where the stage and shell may be re-erected.

Accordingly, it is an object of this invention to provide an improved trailerized shell which may be readily transported for erection at a site whereafter the trailerized shell may be prepared for transportation to another site with relative ease where it may again be erected.

Another object of the invention is to provide a trailerized shell having self contained erecting means so that it may be erected at a site by workmen without special construction equipment.

Still other objects and advantages of the invention will in part be obvious and will in part be apparent from the specification.

*Summary of the invention*

Generally speaking, in accordance with this invention, a trailerized shell is composed of four trailers of the over-the-road type which may be transported from site to site by the usual tractor and which may be moved into place to form the bed for the shell. The floor elements are carried by the trailers and attached together to form a stage floor of relatively large size. The roof structure is also carried by the trailers with beams being provided to jack the roof components into place and support them thereby. The wall elements are stored within the trailers and are placed in position between the stage floor and the roof during the erection of the shell.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 9 is a partial view, at an enlarged scale, of the recting portion of FIG. 6;

FIG. 10 is a partial sectional view taken along line 10—10 of FIG. 9;

FIGS. 11 and 12 are views similar to FIGS. 8 and 7, respectively, showing another form of hinge construction;

Figure 2:
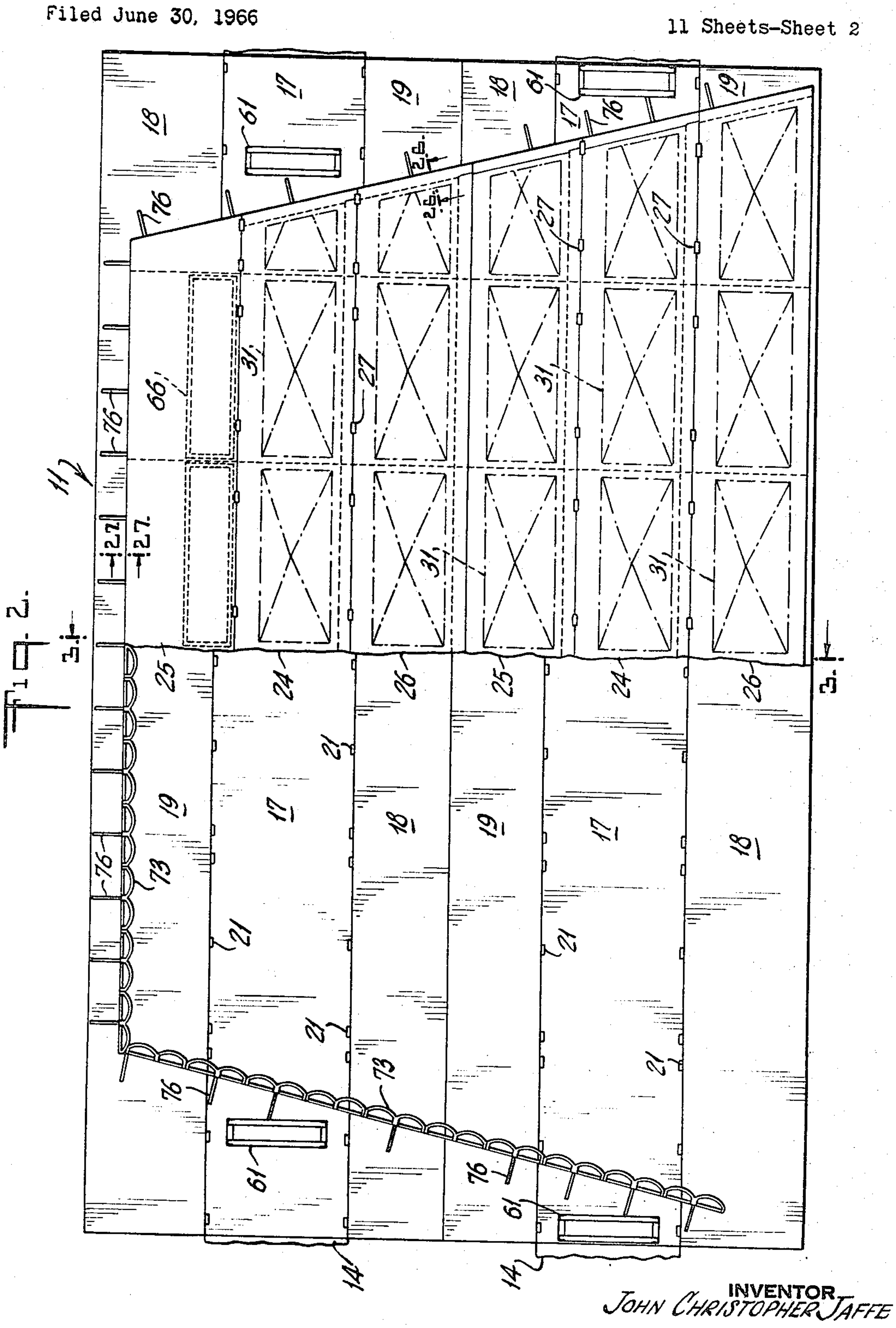
FIG. 2 is a top plan view, partially cut away, taken along line 2—2 of FIG. 1.
Figure 3:
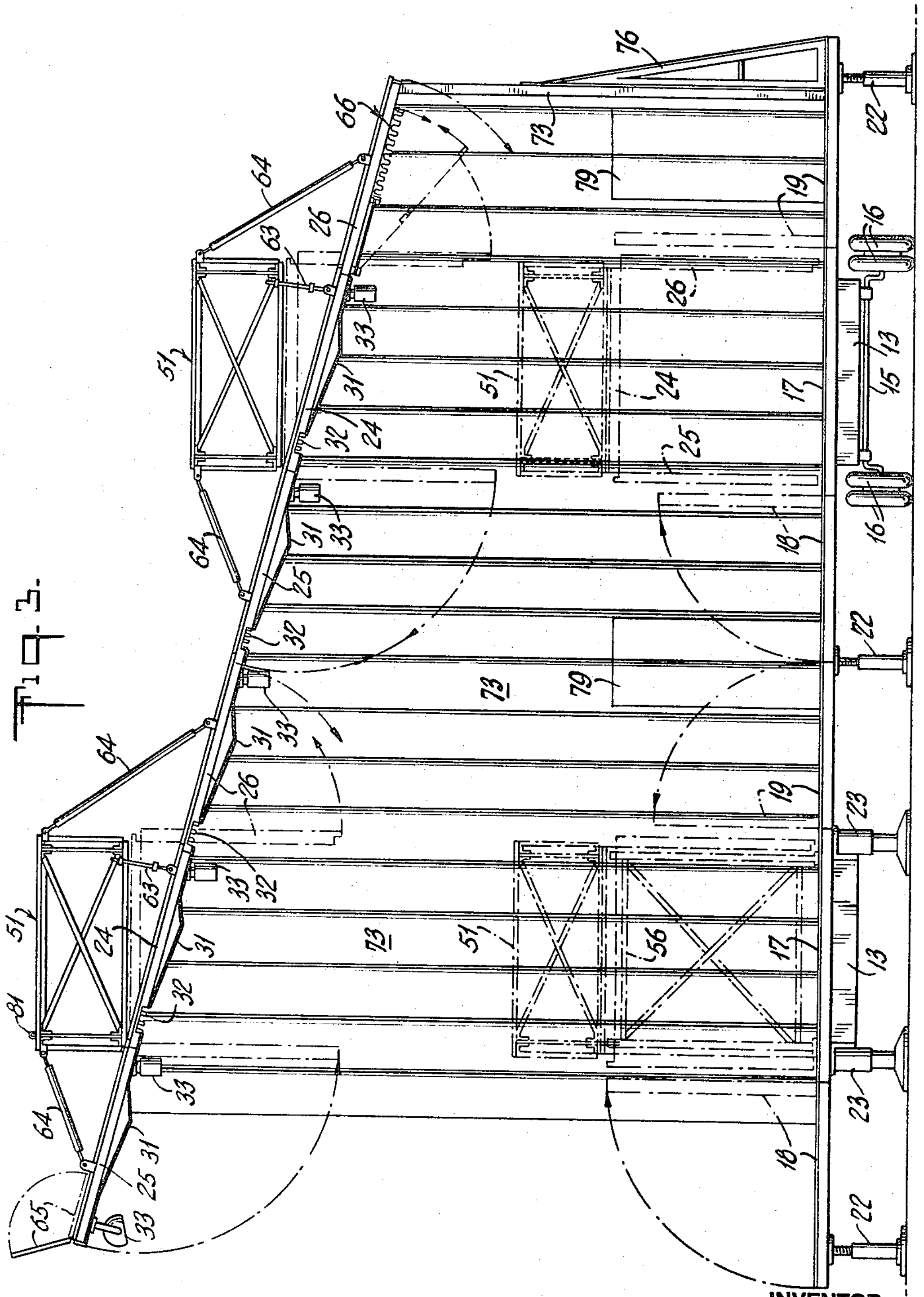
FIG. 3 is a side elevational view taken along line 3—3 of FIG. 2.
Figure 4:
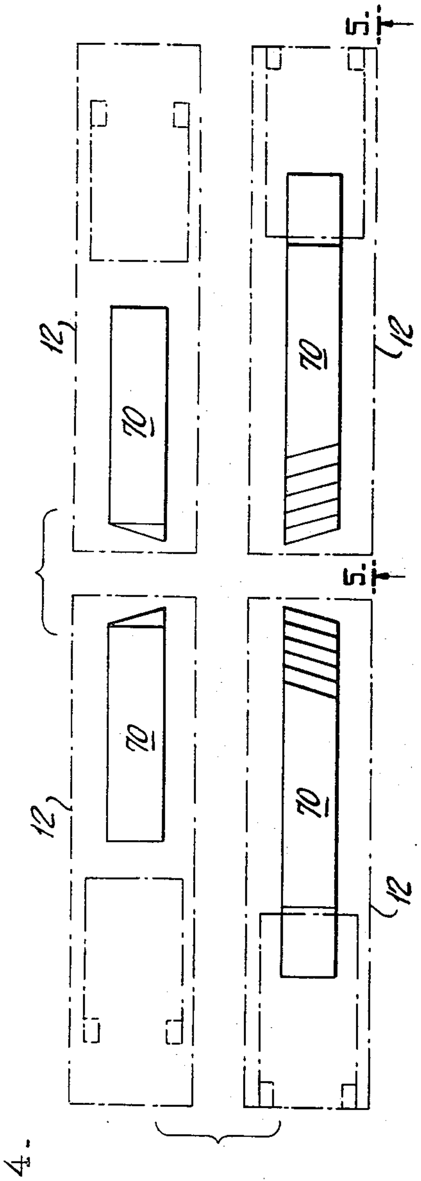
FIG. 4 is an exploded schematic diagram of the arrangement of the four trailers which assemble to form the trailerized shell.

Referring now to FIGS. 1 through 4, the trailerized shell indicated generally at 11 consists of four individual trailers 12 which may be individually transported over the road and which may be maneuvered into place to form the complete base unit for erection of the shell. The four trailers are shown in FIG. 4. Each trailer consists of a frame 13 provided with means 14 for attachment to a tractor and an axle 15 carrying road engageable wheels 16. The frame, wheels, axles and other elements may be constructed in accordance with the known teachings of the trailer art and thus a further detailed description thereon is deemed unnecessary. For erection of the shell, each of the trailers is of similar construction utilizing similar hinging and folding arrangements. Because the shell is narrower at its rear end than at its front while all trailers are of identical size, the two trailers adapted to be placed back to back near the forward portion of the shell are generally identical while the two remaining trailers adapted to be placed back to back at the rear portion of the shell are generally identical and differ with respect to the two forward trailers primarily with respect to location and size of various structural elements.

Figure 16:
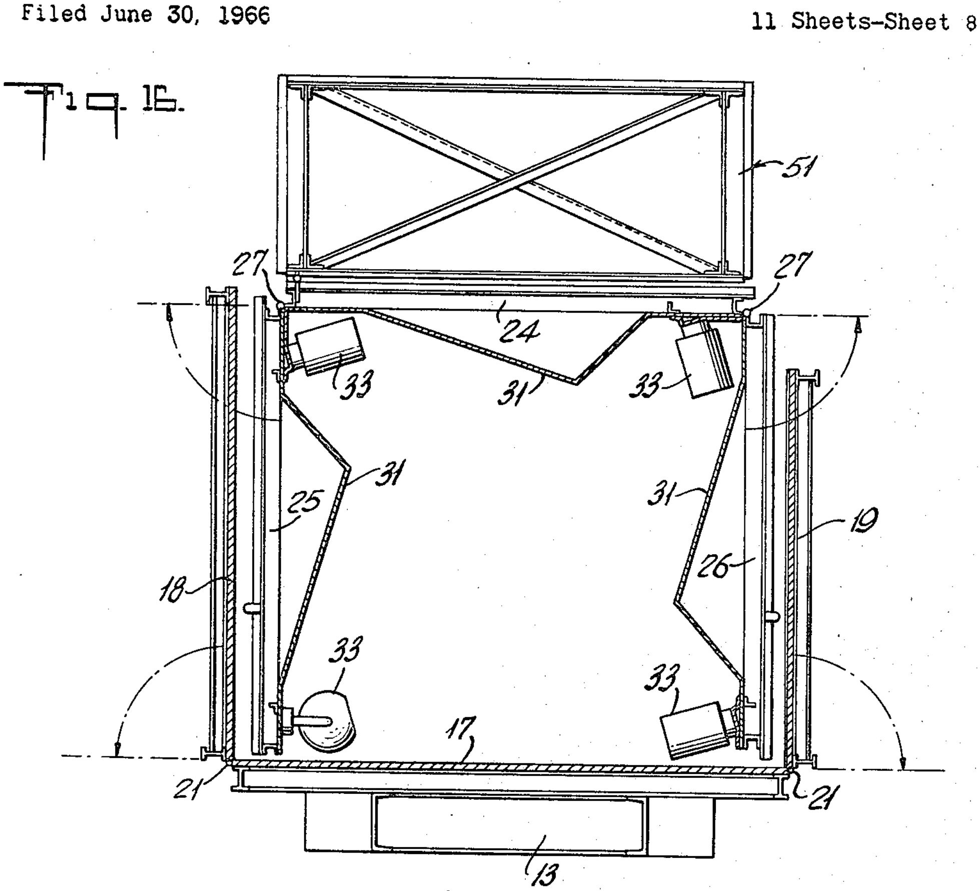
FIG. 16 is a sectional end elevational view of one of the trailer sections in folded position.
Figures 17, 18:
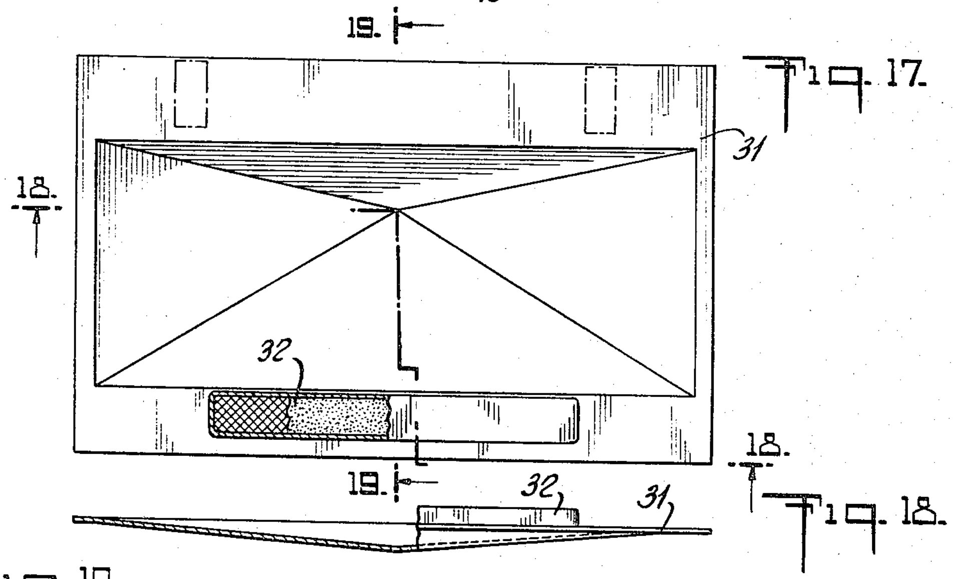
FIG. 17 is a plan view of an acoustical ceiling panel.
FIG. 18 is a partial sectional view taken along line 18—18 of FIG. 17.
Figure 19:
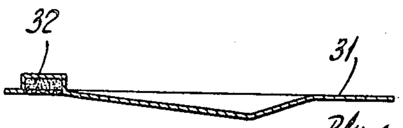
FIG. 19 is a sectional view taken along line 19—19 of FIG. 17.

Referring to FIG. 16 in conjunction with FIGS. 1–4, each trailer frame has mounted thereon a central floor 17 suitably supported by I beams to which are hinged a left floor section 18 and a right floor section 19. Each of the floor sections is also suitably supported by an I beam arrangement to provide the requisite ridigity to the floor sections. It will be apparent from FIGS. 2 and 16 that the left floor section 18 is wider than right floor section 19 with the "left" and "right" designations being indicated merely for the purposes of designation. On the various trailers, the floor sectins 18 and 19 are located so that all floor sections 19 abut at the center of the floor when the trailers are in place.

Figure 21:
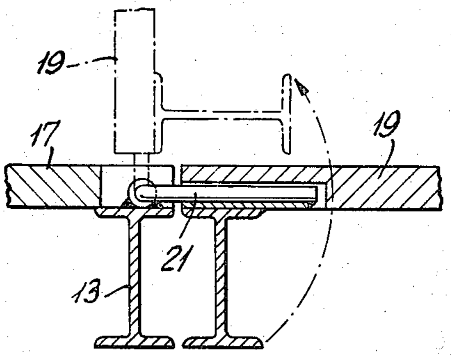
FIG. 21 is an enlarged sectional view of a portion of the floor hinging arrangement of FIG. 16.

The left and right floor sections are hinged to central floor 18 through suitable hinges 21 shown in detail in FIG. 21. The left and right floor sections are rotated to extend upwardly as shown in FIG. 16 and are tied or otherwise held in the raised position for transport. At the site, the floor sections are lowered to rest on suitable jacks 22, the jacks being adjustable to compensate for uneven terrain. The floor sections of adjacent trailers are not otherwise connected together and jacks are placed under the entire structure to support the floor and level same. FIG. 3 shows the floor sections in installed position in full lines and in position for transport in phantom lines. Note that hydrault jacks 3 (FIG. 3) may be permanently affixed to the trailer frame proximate the ground engaging wheels and also near the forward end of the trailer in order to support and level the central floor of each of the trailers. Jacks 22 would preferably be hand operated jacks which can be positioned in place according to terrain requirements. For the sake of clarity, wheels 16 have been omitted from the left trailer shown in FIG. 3.

Figure 20:
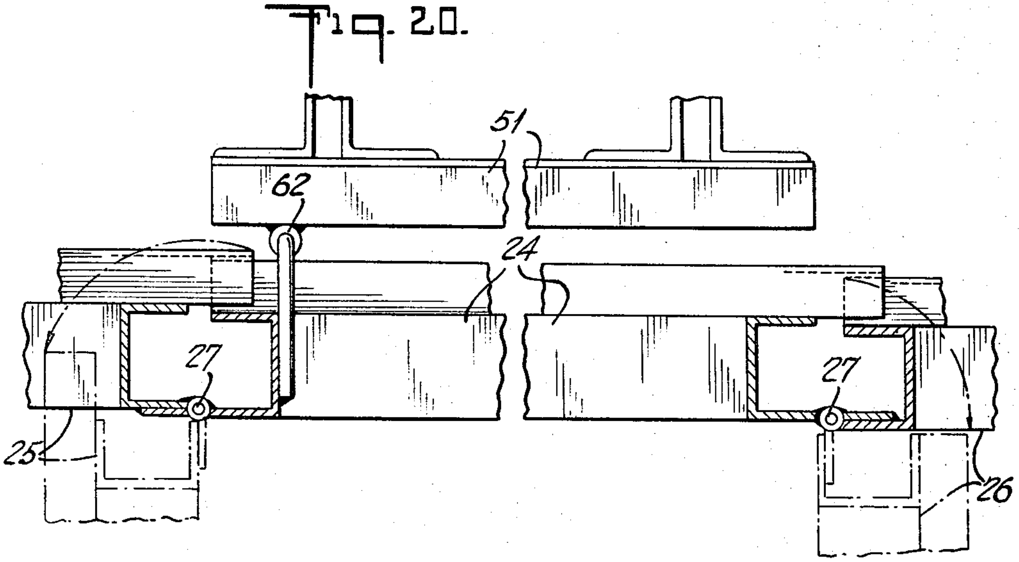
FIG. 20 is an enlarged view of the ceiling hinge portion of FIG. 16.
Figure 23:
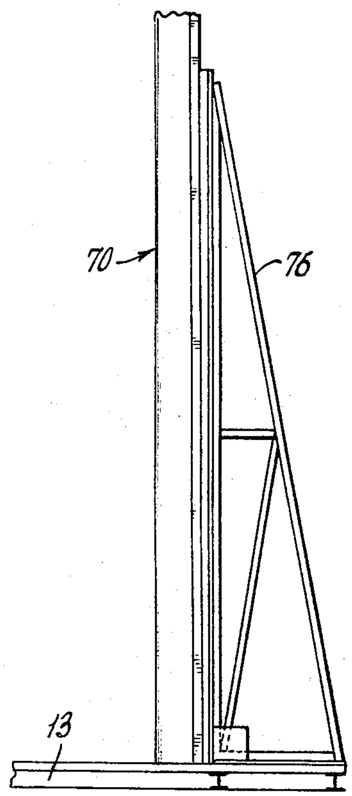
FIG. 23 is an elevational view of a wall panel brace.
Figure 22:
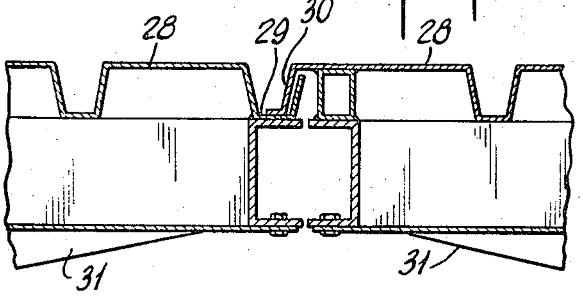
FIG. 22 is an enlarged detail of the roof corner arrangement.
Figure 28:
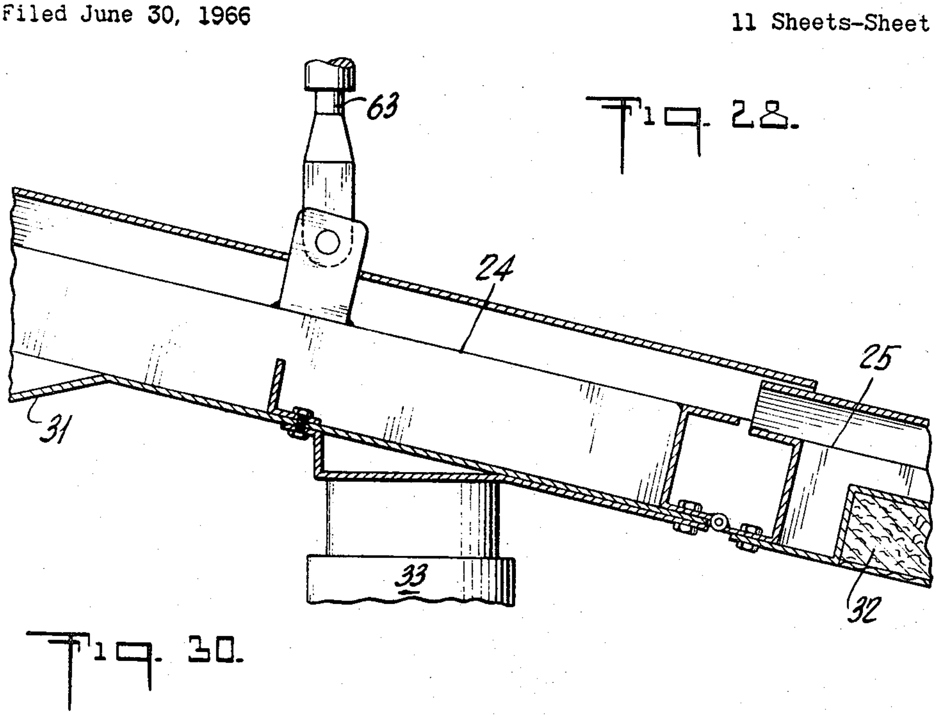
FIG. 28 is an enlarged partial sectional view of the roof panel hinging arrangement shown in FIG. 3.

The ceiling is likewise supported from the trailer beds or frames and is capable of being folded and lowered in sections, for transport. Each trailer includes a column and a beam whereby the beam, when coupled with a longitudinally aligned beam, is supported by the two columns disposed on two adjacent trailers to support the ceiling. The ceiling is best described with reference to FIGS. 1–3, 16, 20, 22 and 28. Each trailer is provided with a central ceiling panel 24 to which is hinged a left panel 25 and a right panel 26. It will be seen from FIG. 16 that the left and right panels are of substantially equal length and are provided with suitable beams for supporting same. The left and right panels are hinged to the central panel through hinges 27 as shown in FIG. 20 with left panel 25 adapted to overlie central panel 24 which in turn is adapted to overlie right panel 26 whereby a substantially water impervious connection is provided when the left and right panels are rotated to the open position shown in full lines in FIG. 20. The folded position is shown in phantom lines in the same figure. The overlaping joint arrangement is shown in greater detail in FIG. 28. A continuous laterally extending channel-shaped reinforcing member 28 (FIG. 22) is secured to the ceiling panels with outer edges which abut when the trailers are moved into adjacent longitudinally aligned positions to prevent water from passing through the joints thereof. For example, the edge of one reinforcing member may open upwardly in the form of a channel 29 for receiving a depending L shaped leg 30 therein. The longitudinal terminal edges of adjacent ceiling sections overlie as at 34 to also provide water impervious connections.

To the interior surface of each of the ceiling panels is secured an acoustical panel 31 preferably formed of a plastic material and having a pyramid configuration so as to control and direct the sound produced within the shell. If desired, a sound absorbing section 32 may also be formed as part of the acoustical panels and may be filled with a sound absorbing medium for selective control of the acoustical properties. As shown in FIG. 2, each of the ceiling panels is provided with an acoustical panel for deflecting sound downwardly and outwardly toward the audience while controlling same. It will also be noted from FIG. 2 that while the floor panels are of equal width to form a rectangular floor, the ceiling panels are narrower at the back of the shell than at the front to form a substantially trapezoidal shaped stage when viewed in plan.

Mounted to the acoustical panels at various selected locations are lights 33 which are connected into an electrical circuit by suitable wiring (not shown) to provide illumination within the shell.

As heretofore stated, each trailer is provided with a structural column and a beam extending parallel to the longitudinal axis of the trailer. Referring especially to FIGS. 6 and 9 through 13, each column consists of a lower column 41 and an upper column 42 fabricated of suitable struts and braces in a manner known in the art. The lower column is pivoted to the trailer frame and the two columns are hinged to one another to fold as shown in phantom lines in FIG. 6. Referring particularly to FIG. 9, plates 43 secured to the trailer frame carry a pivot pin 44 which pivots lower column 41 through an arm 45 which extends from the lower column to a point below the trailer frame. An arm 46 is also secured to the trailer frame and depends therefrom. A hydraulic cylinder 47 is pivotably mounted to arm 46 with the plunger thereof pivoted to arm 45. The hydraulic cylinder will be provided with suitable valves for actuation of the plunger from an external fluid source and, as will be understood in connection with FIG. 9, plunger 47 is effective to rotate lower column 41 to the raised and lowered position.

Figures 6, 7, 8:
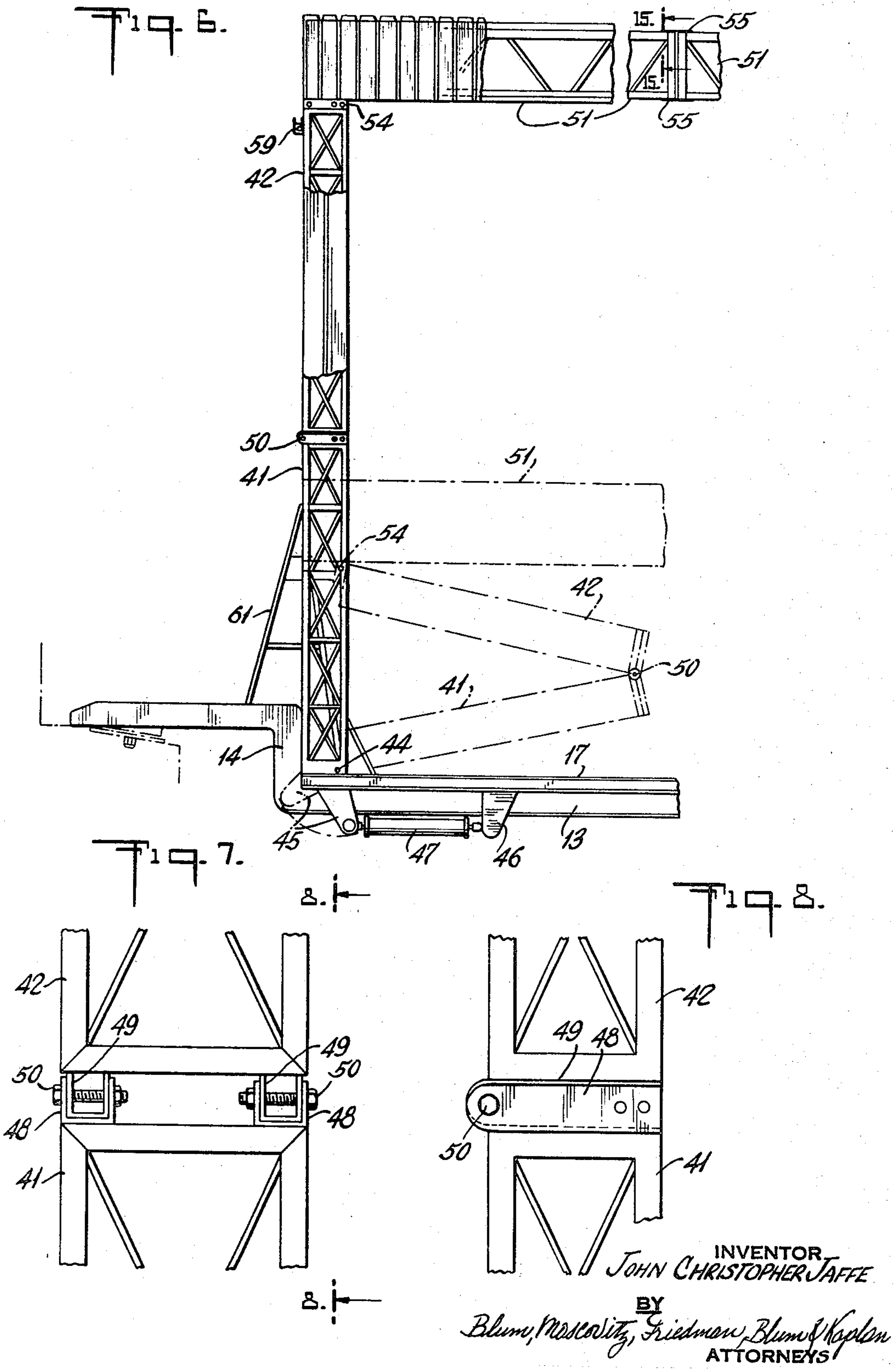
FIG. 6 is a partial elevational view of the support structure for the roof elements.
FIG. 7 is a detailed view of the hinging arrangement of the support elements of FIG. 6.
FIG. 8 is a view looking in the direction of arrows 8—8 of FIG. 7.

Referring particularly to FIGS. 7 and 8, upper column 42 is pivoted to lower column 41 along one edge in order to permit folding of the column as shown in FIG. 6. While the pivoting may be accomplished by any suitable construction, a satisfactory arrangement resides in the provision of two elongated upwardly opened channel shaped members 48 secured to the lower column interfitting with two elongated channel shaped members 49 secured to the supper column with bolt and nuts 50 passing therethrough to provide a pivot at one edge of the columns. With the interfitting channel members, a contact area of relatively large size is provided for stable support of the upper column on the lower column when the columns are in the erected position.

A beam 51 extends from upper column 42 at the upper end thereof and is pivoted so as to be able to remain substantially horizontal as the beam is raised and lowered. A suitable hinging arrangement is shown in FIGS. 11 and 12 wherein support plates 52 are secured to the upper column between pivot plates 53 depending from the beam with a pivot pin 54 extending therethrough.

Figure 15:
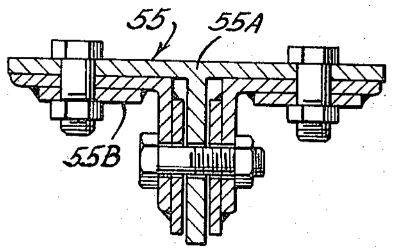
FIG. 15 is a partial sectional view taken along line 15—15 of FIG. 6.

When two trailers are longitudinally aligned, the outer free ends of beams 51 abut and are bolted together by suitable splicing sections 55 shown in detail in FIG. 15. One of the sections secured to one of the beams is in the shape of a T as indicated at 55A while the other section consists of two L-shaped reinforced sections 55B secured to the other beam. When joined, the sections are bolted together to form the splice. When the columns and beam on each trailer are lowered for transport, the free end of the beam is supported by means of a removable support frame 56 shown in phantom in FIG. 3. The support frame secures and supports the free end of the beam as the free end is not otherwise supported. When two trailers are brought in abutting relationship, the free ends of the abutting beams are secured together and the support frames 56 may then be removed. The two joined beams are raised in unison by erection of the columns respectively supporting each beam section at one end thereof.

Figure 13:
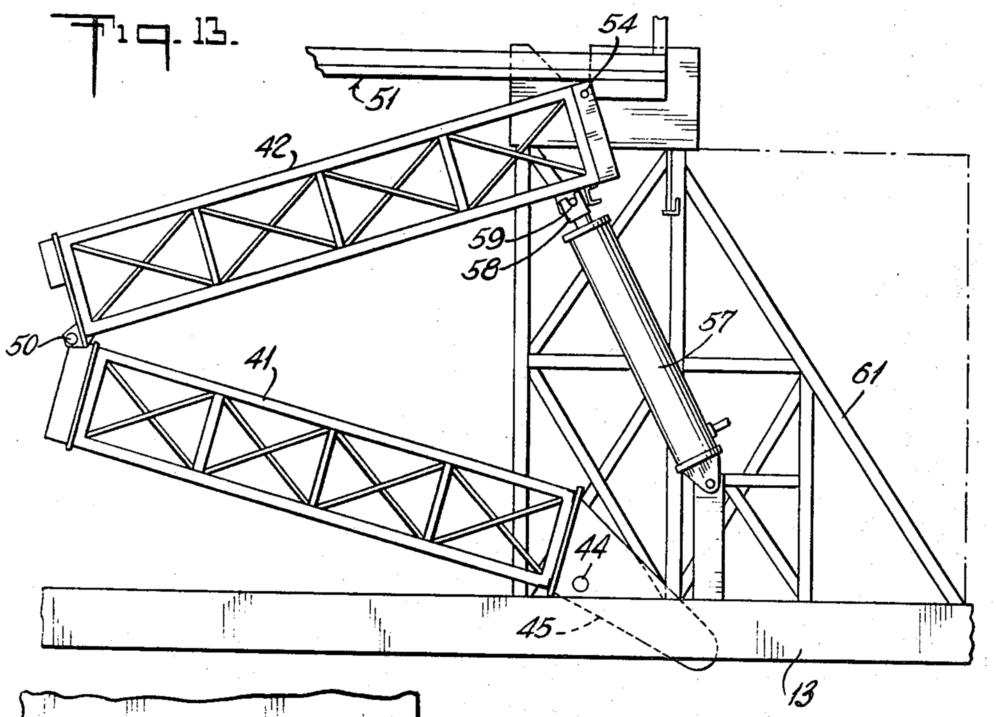
FIG. 13 is a partial side elevational view of the support structure in a lowered position.
Figure 14:
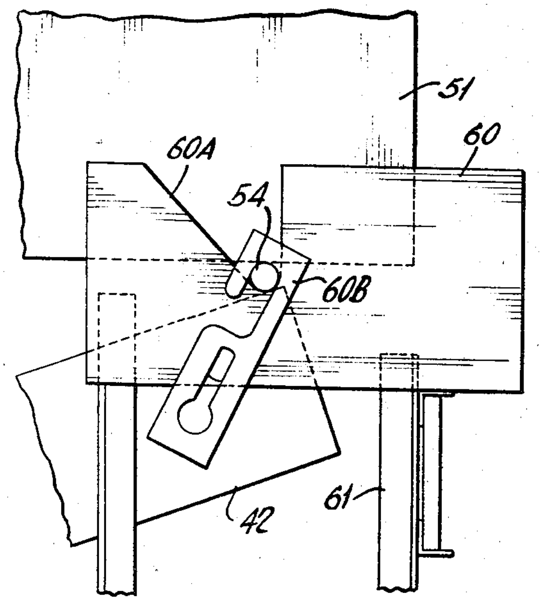
FIG. 14 is a detail, at enlarged scale, of the latching portion of FIG. 13.

As shown in FIGS. 13 and 14, pin 54 may be utilized to lock the columns and beams in the lowered position for transport. A support frame 61 is secured to the trailer frame and carries plates 60 notched as at 60A to receive pin 54. Latch plates 60B hook over pin 54 to selectively lock the structure in the lowered position. If desired, an additional hydraulic cylinder 57 may be secured at one end to the trailer frame and may have a rod receiving plate 58 at the end of the slidable piston adapted to receive a rod 59 secured along the outer side of upper column 42. Hydraulic cylinder 57 aids in erecting the upper and lower columns during the initial phases of erection where the mechanical advantage provided through hydraulic cylinder 47 is at a minimum. Support frame 61 is adapted to be bolted to the column when fully erected to provide additional support therefor. Thus it will be understood that the beams 51 of two adjacent trailers are first secured in the lowered position and then raised in unison by erection of the columns on each of the trailers with the resultant erection of a continuous beam having support columns on each end.

The construction of the beams and columns for all trailers is substantially identical except that it will be evident from FIG. 3 that the columns on the trailers forming the rear end of the shell are shorter than those on the trailers forming the front end of the shell.

Figure 1:
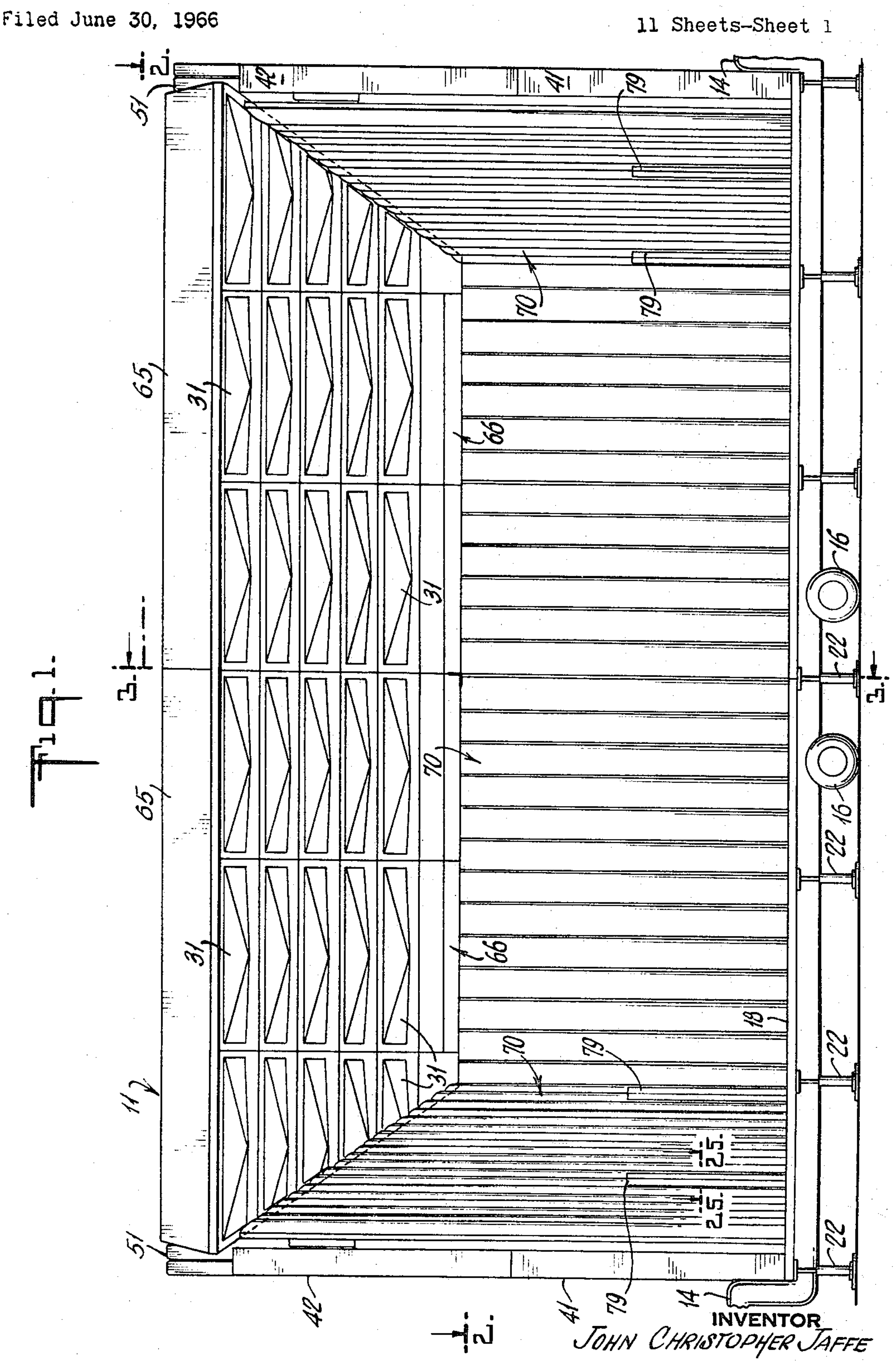
FIG. 1 is a front elevational view of the trailerized shell of the instant invention in the erected position.
Figures 5, 29:
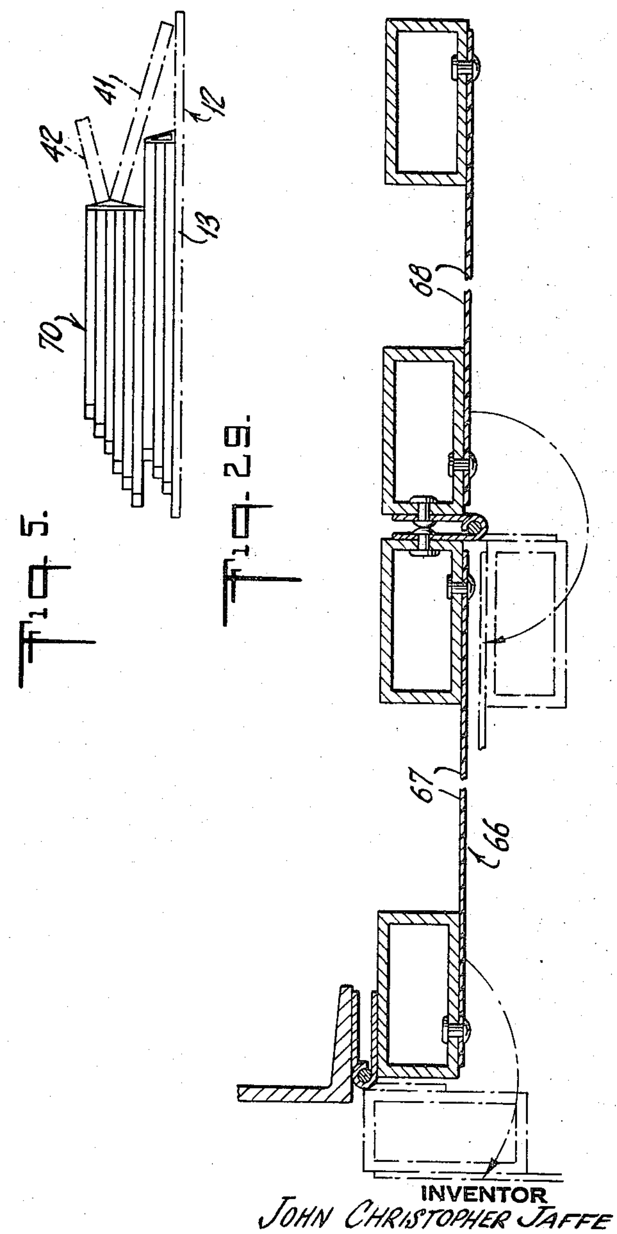
FIG. 5 is an elevational view looking in the direction of the arrows 5—5 on FIG. 4.
FIG. 29 is an enlarged partial sectional view of a detail of FIG. 3.

Turning again to FIGS. 3 and 20, each central ceiling panel is pivoted toward its forward edge to beam 51 through hinges 62. The other end of the central ceiling panel is suspended from beam 51 by adjusting bolts 63 so that the central ceiling panel can be moved up flush with beam 51 for transport as shown in FIG. 16 or lowered to an inclined position as shown in FIG. 3. The left and right panels 25 and 26 are supported in the open position from beam 51 by turn buckles 64 which are removably mounted to the left and right ceiling panels to permit them to be completely lowered for transport. By proper adjustment of turn buckle 64 and adjusting bolt 63, the entire ceiling section may be inclined as shown in FIG. 3. To provide an attractive appearance to the shell, a fascia board 65 may be pivoted to the leading edge of panel 25 as shown in FIGS. 1 and 3. Also, an adjustable acoustical panel 66 may be pivoted to the ceiling panels at the rear end of the stage as a substitute for acoustical panels 31. For sound, central panel 66 may be constructed as two hinged panels 67 and 68 (FIG. 29) which may be pivoted to any desired position.

Figure 24:
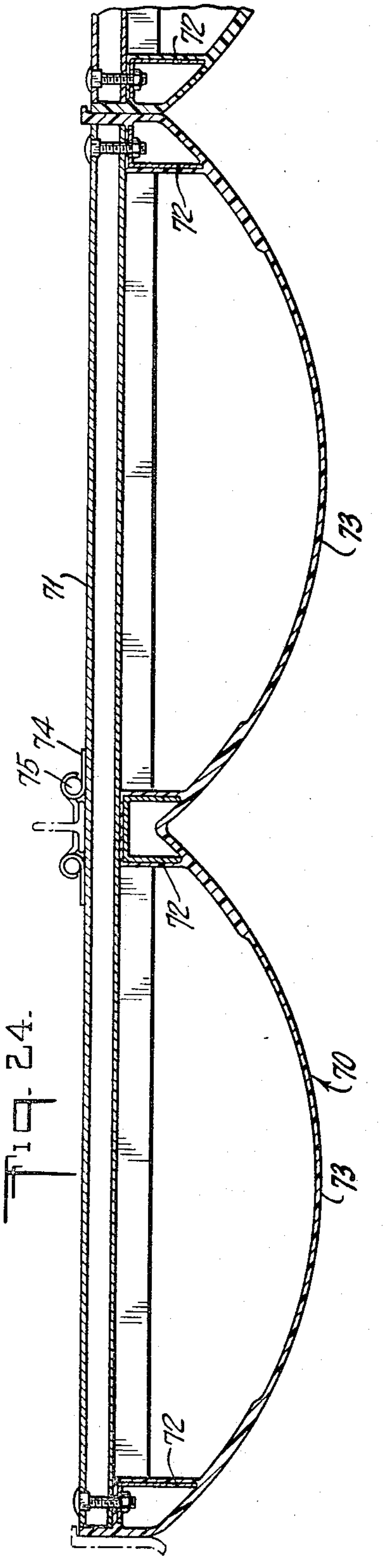
FIG. 24 is a partial sectional plan view of a wall panel shown in FIG. 1.
Figure 26:
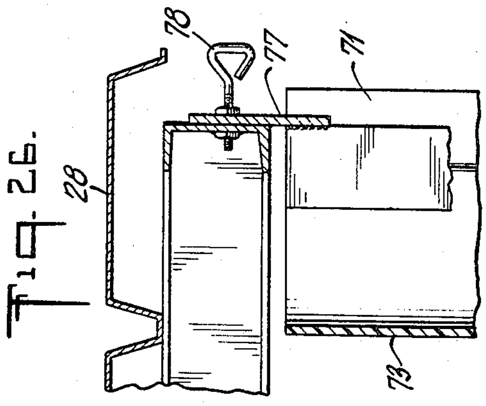
FIG. 26 is an enlarged partial sectional view taken along line 26—26 of FIG. 2.
Figure 27:
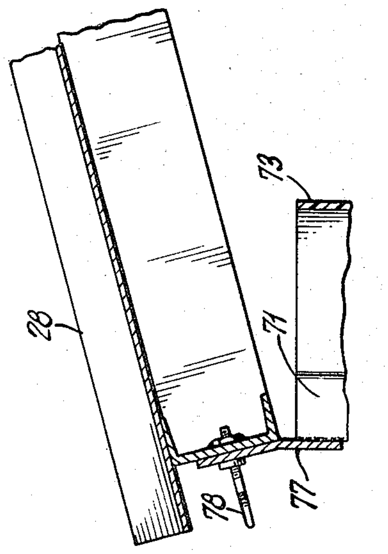
FIG. 27 is an enlarged partial sectional view taken along line 27—27 of FIG. 2.

The foregoing description has primarily been directed to the construction of the floor and ceiling sections of the trailerized shell. Once these sections have been erected, it remains only to erect the side and rear walls which perform no structural function. Each wall panel is constructed as disclosed in FIG. 24 and has tubular frame 71 secured to end and intermediate channels 72 which support a reinforced fibreglass face 73 having a curved W contour in cross section. The wall contour provides for structural rigidity as well as sound reflection and control. Gudgeons 74 are secured along the lower edge of the tubular frame for receiving pintels 75 which are inserted in suitable holes (not shown) in the floor for locating the panels. A support brace 76 is also provided for holding the panels erect. Additionally, plates 77 (FIGS. 26 and 27) extend upwardly from the tubular frame and turn bolts 78 are provided for holding the panels to the reinforcing channel sections of the ceiling members.

Figure 25:
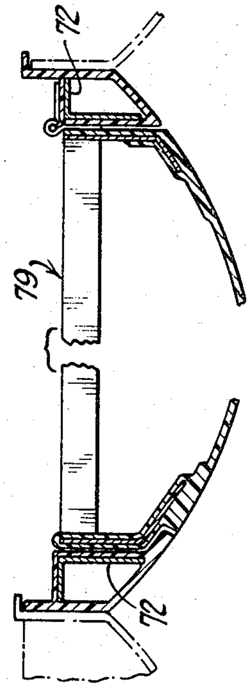
FIG. 25 is an enlarged sectional view taken along line 25—25 of FIG. 1.

As shown in FIGS. 1 and 25, selected side panels are provided with a door panel section 79 hinged to channel 72 to provide a suitable number of doors for entrance to the shell.

It will be understood from FIGS. 1 and 3 that all rear panels are of equal height and that the side panels are of decreasing height from front to rear to follow the roof line. Thus the panels would be numbered or keyed for proper assembly.

Figure 30:
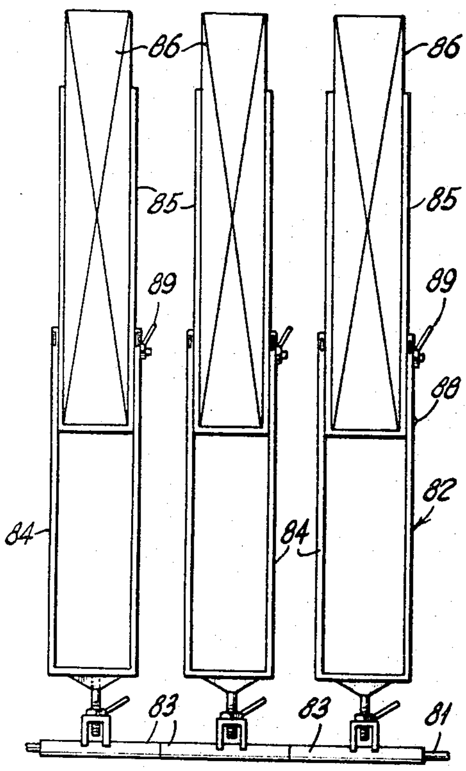
FIG. 30 is a front elevational view of speaker support assemblies.
Figure 31:
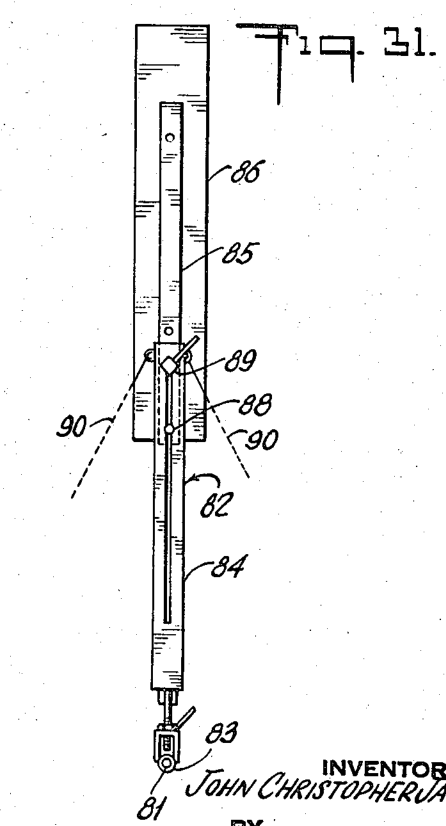
FIG. 31 is a side elevational view thereof.

If electronic sound amplification is desired, a rod 81 (FIGS. 30, 31 and 3) may be secured to the forward beams 51 and carry speaker support frames 82 which are pivoted to rod 81 through tubes 83. The speaker support frame includes a U-shaped member 84 slidably receiving a U-shaped member 85 which carries the speaker 86. Slots 87 in U-shaped member 84 provide for guiding U-shaped member 85 by means of pins 88 and lock arms 89. Guide wires 90 can be used to hold the speakers in the erected position and, for transport, the speaker support frames can be folded onto beam 51.

Turning again to FIGS. 4 and 5, there is shown schematically the location of the columns when folded on the trailer beds and of the side and rear wall panels 70 when stacked for transport. Of course, by reference to FIG. 16, it will be understood that the panels 70 are stacked within the folded floor and ceiling sections but it is to be noted that all of the elements are either pivoted to the trailer bed and folded for transport or stored within the folded ceiling and floor sections whereby each trailer includes a self contained unit which is capable of traveling over the road from site to site.

Also supported on the trailer frame would be a hydraulic pump (not shown) of any known type capable of actuating the hydraulic cylinder heretofore described and a control room (not shown) may also be constructed on one of the trailer beds at the rear end of the shell where the interior walls of the shell are of minimum width. The control room would house equipment such as electrical control equipment and sound amplification equipment.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A trailerized shell comprising a plurality of trailers adapted to be brought together to form a bed for erection of a shell thereon, each said trailer including floor means, ceiling means, support means for supporting said ceiling means, said support means being positionable between a lowered position and a raised position, and erecting means cooperating with said support means for effecting movement thereof between said lowered and raised positions, each said trailer being without side walls permanently mounted thereon, said floor and ceiling means each having foldable portions, said foldable portions forming side walls for said trailer when said support means is in said lowered position, whereby each said trailer may be transported to a site for erection of said shell.

2. A trailerized shell as claimed in claim 1 wherein said floor means on each of said trailers comprises a central floor section, at least one lateral floor section extending from said central floor section along a longitudinal edge thereof, and hinges joining said lateral floor section to said central floor section, said lateral floor section being pivotable between a position coplanar with said central floor section and a position perpendicular thereto, said lateral floor section forming a side wall of said trailer when in said perpendicular position.

3. A trailerized shell as claimed in claim 2 wherein said floor means includes two lateral floor sections extending from said central floor section along opposite longitudinal edges thereof.

4. A trailerized shell as claimed in claim 1 wherein said ceiling means on each of said trailers comprises a central ceiling section, at least one lateral ceiling section extending from said central ceiling section along a longitudinal edge thereof, and hinges joining said lateral ceiling section to said central ceiling section, said lateral ceiling section being pivotable between a position coplanar with said central ceiling section and a position perpendicular thereto, said lateral ceiling section forming a side wall of said trailer when in said perpendicular position.

5. A trailerized shell as claimed in claim 4 wherein said ceiling means includes two lateral ceiling sections extending from said central ceiling section along opposite longitudinal edges thereof.

6. A trailerized shell as claimed in claim 1 wherein said support means on each of said trailers comprises a lower column, means pivoting said lower column to said trailer, an upper column, means pivoting said upper column to said lower column, a beam extending parallel to the longitudinal axis of said trailer, means pivoting one end of said beam to said upper column, and means at the other end of said beam for connecting said beam to a longitudinally aligned beam on another of said trailers, said other end of said beam being supported by said longitudinally aligned beam in said raised position.

7. A trailerized shell as claimed in claim 6 including a removable frame for supporting said other end of said beam on said trailer when said support means is in said lowered position.

8. A trailerized shell as claimed in claim 4 including an acoustical panel secured to the interior surface of each of said ceiling sections.

9. A trailerized shell as claimed in claim 6 wherein said lower column pivot means includes an arm secured at one end to said lower column and a pin pivoting said arm intermediate its ends to said trailer, said erecting means including a hydraulic cylinder acting between said trailer and the other end of said arm to effect rotation of said lower column between a lowered and raised position.

10. A trailerized shell as claimed in claim 9 wherein said erecting means further includes a second hydraulic cylinder acting between said trailer and said upper column to effect rotation of said upper column between a lowered and a partially raised position.

11. A trailerized shell as claimed in claim 1 including side panels mountable between said floor means and said ceiling means when said support means is in said raised poition and means for releasibly securing said side panels to said floor and ceiling means.

12. A trailerized shell comprising a plurality of trailers adapted to be brought together to form a bed for erection for a shell thereon, each said trailer including floor means, ceiling means, at least one beam for supporting said ceiling means, beam support means positionable between a lowered position and a raised position, erecting means cooperating with said beam support means for effecting movement thereof between said lowered and raised positions, said beam having a completely unsupported end, and means for supporting said unsupported end in said lowered position only, said unsupported end being supported in said raised position by connection to a like end on another one of said trailers.

References Cited

UNITED STATES PATENTS

| | | | |
|---|---|---|---|
| 559,964 | 5/1896 | Bierstadt | 296—23.7 |
| 559,966 | 5/1896 | Bierstadt | 296—23.7 |
| 1,734,803 | 11/1929 | Gable | 296—23.2 |
| 2,450,152 | 1/1946 | Miller | 52—115 |
| 2,473,076 | 6/1949 | Scheibner | 52—71 |
| 2,762,084 | 9/1956 | Singer | 52—79 |

FOREIGN PATENTS

| | | |
|---|---|---|
| 857,033 | 1952 | Germany. |

HENRY C. SUTHERLAND, *Primary Examiner.*

U.S. Cl. X.R.

52—66, 69, 115, 73; 296—23